Patented Mar. 16, 1954

2,672,473

UNITED STATES PATENT OFFICE 2,672,473

BIS-TRIORGANOSILYL-SUBSTITUTED OXIMES

Leo H. Sommer, State College, Pa., assignor to Dow Corning Corporation, Midland, Mich., a corporation of Michigan No Drawing. Application December 13, 1951, Serial No. 261,599

5 Claims. (Cl. 260—448.2)

This invention relates to oximes having two triorganosilyl groups in the molecule.

In this application, Me designates the methyl radical.

In the applicant's copending application entitled "Bis-Triorganosilyl-Substituted Ketones," filed concurrently herewith, it is disclosed how to prepare ketones of the formula

[RMe₂Si(CH₂)ₙ]₂CO

This invention relates to the corresponding oximes which are prepared by reacting the ketones with hydroxylamine.

Thus, this invention relates to compounds of the formula [RMe₂Si(CH₂)ₙ]₂CNOH where R is a phenyl or methyl radical and $n$ has a value from 2 to 5 inclusive.

These compounds are best prepared by heating a mixture of the ketone and hydroxylamine hydrochloride in a solvent consisting of a mixture of absolute alcohol and pyridine. The reaction is facilitated by heating the mixture preferably at reflux temperature. The reaction mixture is then cooled and the products collected by filtration.

The products of this invention are useful as intermediates in the preparation of polysiloxanes having amino groups in the molecule.

The following examples are illustrative only and are not to be construed as limiting the invention which is properly set forth in the appended claims.

Example 1

134.5 grams of the ketone [Me₃Si(CH₂)₂]₂CO was dissolved in 250 ml. of absolute ethanol and mixed with a solution of 44.6 grams of hydroxylamine hydrochloride in 225 ml. of pyridine. The solution was refluxed on a steam bath for two hours. The reaction mixture was cooled and the solvents were evaporated at reduced pressure. The residue was a crystalline material which was recrystallized from methanol. There was obtained 122.5 grams of the oxime

[Me₃Si(CH₂)₂]₂CNOH melting point 76° to 76.5° C. The material was analyzed and found to contain 22.85 per cent silicon.

Example 2

The oximes shown below are obtained when the ketones shown below are reacted with hydroxylamine hydrochloride in accordance with the procedure of Example 1.

| Ketone | Oxime Obtained |
|---|---|
| [C₆H₅Me₂Si(CH₂)₂]₂CO | [C₆H₅Me₂Si(CH₂)₂]₂CNOH |
| [Me₃Si(CH₂)₃]₂CO | [Me₃Si(CH₂)₃]₂CNOH |
| [Me₃Si(CH₂)₄]₂CO | [Me₃Si(CH₂)₄]₂CNOH |
| [C₆H₅Me₂Si(CH₂)₅]₂CO | [C₆H₅Me₂Si(CH₂)₅]₂CNOH |

That which is claimed is:

1. An oxime of the formula

[RMe₂Si(CH₂)ₙ]₂CNOH where R is selected from the group consisting of methyl and phenyl radicals and $n$ has a value from 2 to 5 inclusive.
2. An oxime of claim 1 in which $n$ is 2.
3. An oxime of claim 1 in which $n$ is 3.
4. An oxime of claim 1 in which $n$ is 4.
5. An oxime of claim 1 in which $n$ is 5.

LEO H. SOMMER.

No references cited.